(No Model.) 2 Sheets—Sheet 1.
G. DOERFLINGER.
ORE SEPARATOR.
No. 517,974. Patented Apr. 10, 1894.
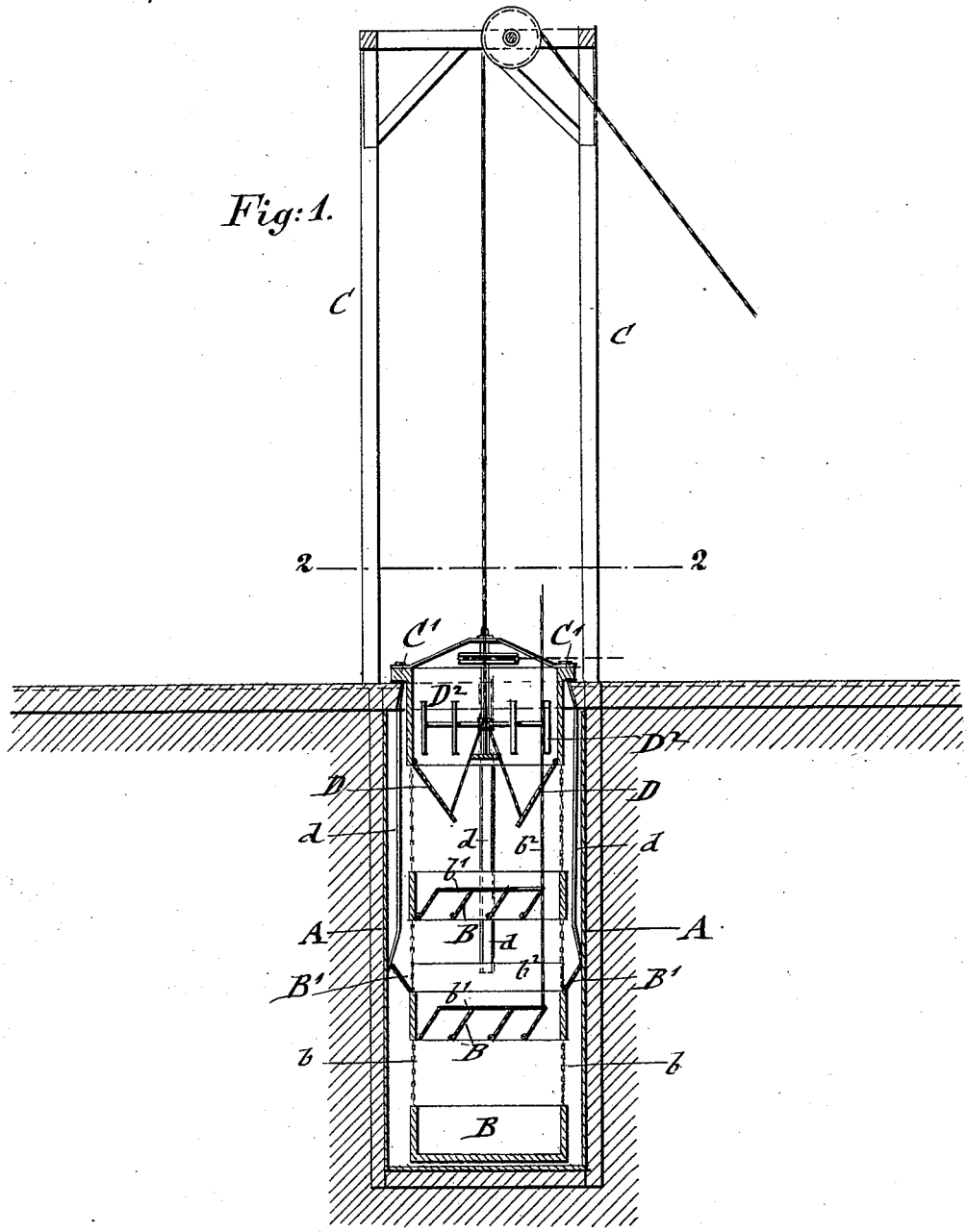
Fig: 1.
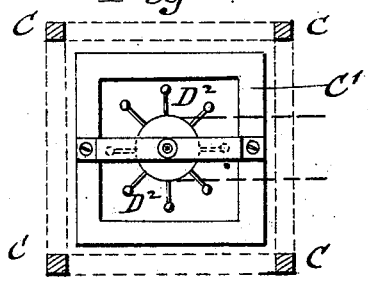
Fig: 2.
WITNESSES:
Charles Schroeder
Otto Reiss
INVENTOR
George Doerflinger
BY
Goepel & Raegener
ATTORNEYS.

(No Model.) 2 Sheets—Sheet 2.
G. DOERFLINGER.
ORE SEPARATOR.
No. 517,974. Patented Apr. 10, 1894.
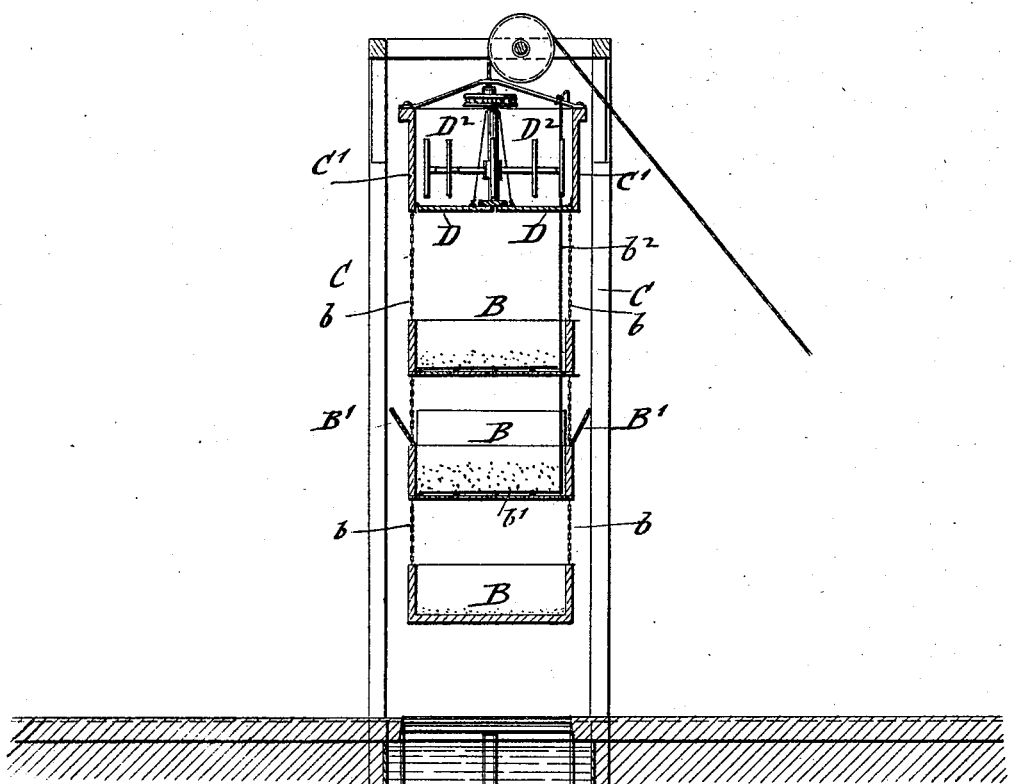
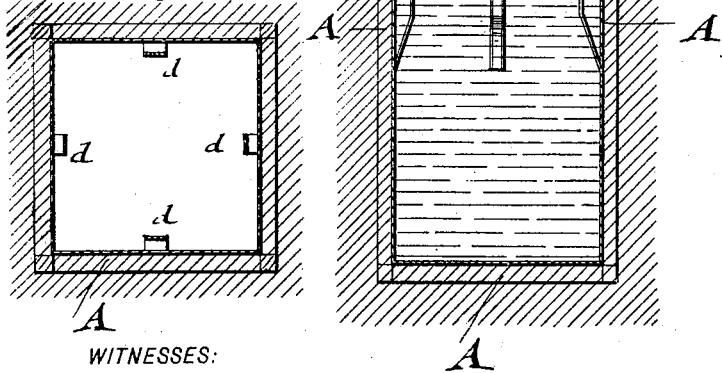
WITNESSES:
Charles Schroeder.
Otto Reiss.
INVENTOR
George Doerflinger
BY
Goepel & Raegener
ATTORNEYS.

UNITED STATES PATENT OFFICE.

GEORGE DOERFLINGER, OF BROOKLYN, NEW YORK.

ORE-SEPARATOR.

SPECIFICATION forming part of Letters Patent No. 517,974, dated April 10, 1894.

Application filed September 28, 1893. Serial No. 486,709. (No model.)

*To all whom it may concern:*

Be it known that I, GEORGE DOERFLINGER, a citizen of the United States, residing in the city of Brooklyn, in the county of Kings and State of New York, have invented certain new and useful Improvements in Ore-Separators, of which the following is a specification.

This invention relates to an improved means for separating ores from the earthy particles mixed with the same, according to the different specific gravities of the same, the invention being designed with the view of preventing the great waste of water heretofore involved in separating ore, and of reducing the quantity of water employed to a comparatively small quantity.

The invention consists of an ore-separator which is composed of a tank filled with water, and a number of trays or pans which are suspended one below the other, the lowest tray having a solid bottom while the bottoms of the upper trays are formed of hinged slats which are operated by suitable mechanism and moved into raised position when dropping the ground ore through the same. Above the trays is arranged a hopper provided with an agitator in the same, said hopper having drop-gates so that the ore after being mixed with the water can be dropped, the particles of the ore being intercepted by and detained in the upper trays and the lower tray according to their specific gravities by closing the bottoms of the trays. The hopper and trays are suspended by a suitable hoisting rope so as to raise them above or lower them into the tank.

The invention also consists in the construction and combination of parts and details which will be fully described hereinafter and finally pointed out in the claims.

In the accompanying drawings, Figure 1 represents a vertical central section, showing my improved apparatus for separating ores according to their specific gravity, the figure showing the trays suspended in the tank while in the act of separating the heavy metallic particles from the lighter ones and the earth mixed with the same. Fig. 2 is a top view of Fig. 1, partly in section on line 2 2, Fig. 1. Fig. 3 is a vertical central section taken on the same plane as Fig. 1, but showing the collecting trays raised out of the tank ready for removing the ore which is deposited in the trays, and Fig. 4 is a horizontal section, on line 4, 4, of Fig. 3.

Similar letters of reference indicate corresponding parts.

Referring to the drawings, A represents a tank which is preferably constructed of wood or other suitable material and of sufficient depth to provide for the different trays, or pans B, B. The tank A is lined with sheet metal or other suitable material, so that its side walls are smooth and water-tight. The tank A is filled with water and a series of trays B, B, which are suspended by chains $b$ from a hopper C', are submerged into the same. The tank A is made either of square, oblong, or cylindrical shape, being made of slightly larger width than the trays that are lowered into the same. The tank A is further provided at its sides with vertical projecting ribs or ways $d$, $d$, that extend to a little below one half the depth of the same, said ribs being tapered at the lower ends so that the side-boards B' that are hinged to the side walls of the intermediate trays B bear on the vertical ribs, for the purposes hereinafter described.

Above the tank A is arranged a frame C of sufficient height to permit the lifting of the different trays to the required height by a suitable pulley and hoisting rope or other device. The frame C is constructed of sufficient strength so as to provide for the load that is to be raised in the trays, the frame corresponding in cross-area to the size of the tank, so that the trays that are submerged in the tank A, can be readily raised in the same, and that the ore which is collected in the trays can be removed successively from one tray after the other.

Above the vertically-movable set of trays is arranged the hopper-shaped receptacle C' which is provided with hinged drop-gates D and with an agitator $D^2$, which is rotated by suitable mechanism so as to keep the ground ore charged into said hopper or receptacle in motion. The trays B B below the hopper C' are formed of solid side-walls and hinged bottom-slats, which are connected by rods $b'$ at the ends, said rods being connected with a suitable hoisting-rope $b^2$ so as to permit the opening or closing of the slat-bottoms of the trays B. The lowermost tray is provided with solid side-walls and bottom, and suspended by chains below the intermediate slat-bottomed trays. The tray B next above the bottom-tray is provided at its sides with hinged side-boards B' which, when the tray is lowered into the tank A, move along the raised vertical ways until when they pass the tapered lower ends of the latter they are dropped back toward the wall of the tank A. The hinged sideboards serve to prevent the passage of any light particles of ore from the intermediate tray to the space in the main-tank A, below the same.

The raised vertical ribs or ways $d, d$, are for the purpose of guiding the trays or pans as they are lowered into the tank, and also to provide a space between the walls of the tank and the side-walls of the trays or pans, whereby the water displaced by the trays or pans is permitted to rise over the same.

A track is arranged on a level with the mouth of the tank A, so that the material to be separated can be moved in cars on the track to and from the separator. It is charged from the cars into the hopper-shaped receptacle C' after the same and the trays are submerged in the tank A. After the hopper-shaped receptacle C', the intermediate trays and the bottom-tray are submerged in the tank, the agitator in the hopper is set in motion, so as to mix the water in the hopper with the ground ore. As soon as the required mixture is obtained, the drop-gates of the hopper are lowered, so that the entire charge is suddenly dropped through the lower trays, the slat-bottoms of which are placed in open position, so as to give the ore-particles a chance to drop through the water and open slats of the tanks, according to their specific gravities. After the particles of ore are dropped from the hopper C' a certain time is permitted to elapse before the slat-bottoms of the intermediate trays are closed so as to intercept the ore-particles according to their different specific gravities as they are dropped through the water in the tank. The particles of less specific gravity are intercepted by the uppermost tray, while the particles of higher specific gravity are intercepted by the next or second tray, and the particles of the highest specific gravity pass quickly through the intermediate trays and drop into the lowermost tray which is gradually filled up with particles of the ore having the highest specific gravity. The hopper and trays are then lifted by the hoisting mechanism as far as permitted by the supporting-frame. During the lifting operation, the water is drained from the trays and returned to the tank A. As one tray after the other arrives on a level with the track by which the ore is conducted to or from the separator, one tray after the other is cleaned of the ore which has been collected in the same. When the apparatus is again charged the same round of operation is repeated.

The water in the tank can be utilized for a considerable length of time it forming the medium through which the ore and other particles are dropped. From time to time, however, it is necessary to replace the water, as the same becomes too much charged with earth to be of further use. The quantity of water required is very small, and can be furnished at much less trouble and expense than the large quantities of water heretofore used for separating ore by gravity. By the apparatus herein described, ores can be separated according to their specific gravities by means of a comparatively shall quantity of water so that the objectionable feature to the hydraulic separation of ore is to a great extent obviated.

Having thus described my invention, I claim as new and desire to secure by Letters Patent—

1. An ore-separator, consisting of a tank filled with water, a hopper-shaped receptacle, an agitator in said hopper, a series of trays suspended below said hopper and provided with bottoms which can be opened or closed at will, and means for hoisting and lowering the trays, substantially as set forth.

2. An ore-separator, consisting of a tank having inwardly-projecting guide-ways extending along the upper portion of said tank, a supporting-frame placed vertically above said tank, a hopper-shaped receptacle suspended from said frame, an agitating device in said hopper, and a series of trays suspended from the hopper, the intermediate trays being provided with hinged bottom-slats, while the lowermost tray is made solid, and hinged top flanges on the intermediate trays which are adapted to prevent the ore-particles from passing into the tank outside of the tray, substantially as set forth.

3. In an ore-separator, the combination, with a tank filled with water, a supporting-frame located above said tank, a hopper suspended from the frame and provided with an agitator and drop-gate, and a series of trays suspended from the charging chamber or hopper, the intermediate trays being provided with hinged slat-bottoms, and means for hoisting or lowering the hopper and trays, substantially as set forth.

4. The process herein-described of separating ore from lighter particles, which consists in mixing the ground ore in a liquid column, then permitting the ore to drop through the liquid column, next intercepting and detaining the ore-particles in their fall or descent through said liquid column, after a certain time, while suspended at their different depths in said liquid column, so as to separate the particles bodily according to their different specific gravities, and finally elevating and successively draining the different deposits above the liquid column, and removing the different deposits from the intercepting media, substantially as set forth.

In testimony that I claim the foregoing as my invention I have signed my name in presence of two subscribing witnesses.

GEORGE DOERFLINGER.

Witnesses:
CHARLES SCHROEDER,
PAUL GOEPEL.